(12) United States Patent
Windschauer et al.

(10) Patent No.: US 9,668,505 B2
(45) Date of Patent: Jun. 6, 2017

(54) TASTE MASKING COMPOSITIONS AND EDIBLE FORMS THEREOF FOR MASKING THE TASTE OF FOODS

(71) Applicant: Acme Specialty Products, LLC, Tampa, FL (US)

(72) Inventors: Robert J. Windschauer, Largo, FL (US); Teresa T. Virgallito, Beavercreek, OH (US)

(73) Assignee: ACME SPECIALTY PRODUCTS, LLC, Tampa, FL (US)

( * ) Notice: Subject to any disclaimer, the term of this patent is extended or adjusted under 35 U.S.C. 154(b) by 0 days.

(21) Appl. No.: 13/769,486

(22) Filed: Feb. 18, 2013

(65) Prior Publication Data

US 2014/0234509 A1 Aug. 21, 2014

(51) Int. Cl.
- A23L 1/22 (2006.01)
- A23L 29/212 (2016.01)
- A23L 29/25 (2016.01)
- A23L 27/00 (2016.01)

(52) U.S. Cl.
CPC ......... A23L 1/22075 (2013.01); A23L 27/84 (2016.08); A23L 29/212 (2016.08); A23L 29/25 (2016.08); *A23V 2002/00* (2013.01)

(58) Field of Classification Search
CPC ............................ A23L 1/2205; A23L 1/22075
USPC .................... 426/573, 576, 577, 575, 578
See application file for complete search history.

(56) References Cited

U.S. PATENT DOCUMENTS

| | | | | |
|---|---|---|---|---|
| 3,561,973 | A * | 2/1971 | Rutman et al. | 426/7 |
| 4,276,311 | A * | 6/1981 | Burrows et al. | 426/56 |
| 5,422,134 | A * | 6/1995 | Hart et al. | 426/573 |
| 6,475,514 | B1 * | 11/2002 | Blitzer et al. | 424/449 |
| 6,540,978 | B1 * | 4/2003 | Margolskee et al. | 424/9.2 |
| 7,648,712 | B2 | 1/2010 | Bess et al. | |
| 2003/0077362 | A1 * | 4/2003 | Panhorst et al. | 426/103 |
| 2005/0008735 | A1 * | 1/2005 | Pearce | 426/89 |
| 2005/0089548 | A1 | 4/2005 | Virgalitto et al. | |
| 2005/0208108 | A1 | 9/2005 | Jannusch et al. | |
| 2005/0233048 | A1 | 10/2005 | Kitamura et al. | |
| 2006/0024335 | A1 * | 2/2006 | Roger | 424/400 |
| 2006/0035008 | A1 | 2/2006 | Virgallito et al. | |
| 2006/0099277 | A1 * | 5/2006 | Jewett et al. | 424/729 |
| 2007/0059421 | A1 * | 3/2007 | Catani et al. | 426/548 |
| 2007/0087036 | A1 | 4/2007 | Durschlag et al. | |
| 2007/0148307 | A1 * | 6/2007 | Sherwood et al. | 426/590 |
| 2008/0044454 | A1 | 2/2008 | Yang et al. | |
| 2008/0057112 | A1 | 3/2008 | Knoop et al. | |
| 2008/0279903 | A1 | 11/2008 | Liu | |
| 2009/0011115 | A1 | 1/2009 | Foss et al. | |
| 2009/0196907 | A1 | 8/2009 | Bunick et al. | |
| 2010/0055264 | A1 * | 3/2010 | Liniger | A23G 3/0097 426/303 |
| 2010/0068350 | A1 | 3/2010 | Shen et al. | |
| 2010/0297232 | A1 | 11/2010 | Myers et al. | |
| 2011/0123692 | A1 | 5/2011 | Eroma et al. | |

FOREIGN PATENT DOCUMENTS

WO 97/02273 1/1997

OTHER PUBLICATIONS

Goel et al. "Orally Disintegrating Systems: Innovations in Formulation and Technology," Recent Patents on Drug Delivery & Formulation, vol. 2, No. 3, pp. 258-274 (2008).
Specifications: "Natural Masking Agent for Animal Protein O.S. #5187," by GSB & Associates (Apr. 5, 2016).

* cited by examiner

*Primary Examiner* — Felicia Turner
(74) *Attorney, Agent, or Firm* — Thompson Hine LLP

(57) ABSTRACT

Disclosed are edible compositions, for example, edible films and gummi confectioneries, that mask the taste of bitter tasting foods and/or foods that contain proteins such as meats and vegetables like broccoli, cabbage, spinach, etc. The edible compositions include a delivery vehicle, a protein masking agent constituting about 0.01% to about 25% dry weight thereof, and a bitter masking agent constituting about 0.1% to about 7% dry weight thereof. The composition may also include other ingredients including flavoring agents, sweetening agents, and sensates.

18 Claims, No Drawings

TASTE MASKING COMPOSITIONS AND EDIBLE FORMS THEREOF FOR MASKING THE TASTE OF FOODS

FIELD OF THE INVENTION

The present invention relates to taste masking compositions, in particular, edible forms of the taste masking composition for masking the taste of foods such as those having undesirable tastes to people, in particular, children.

BACKGROUND OF THE INVENTION

Because of the unpleasant taste of some foods such as vegetables like broccoli or brussel sprouts many people, especially children, do not or will not eat them. However, nutrition may be sacrificed as a result. Broccoli is part of the Brassica family, along with its odd-tasting relatives such as brussel sprouts, cabbage, and cauliflower. This family of vegetable is known to have a bitter taste and smell. Although bitterness can sometimes be desirable—such as in the taste of coffee or chocolate—more often bitter taste causes rejection that can interfere with food selection, nutrition and therapeutic compliance. This is especially true for children.

But it seems that the more bitter the food tastes, the better it is for you. Nutrition scientists know that broccoli, and all of its bitter-tasting mates, are rich in minerals, fibre and various vitamins. Spinach is another bitter-tasting vegetable that is high in nutrients like calcium, magnesium and zinc.

Added flavorings alone or in combination with sweetening agents have been employed to improve taste and palatability in masking pharmaceuticals. Flavorings and sweetening agents, however, are not satisfactorily effective against bitter tasting substances.

Various delivery vehicles for taste masking or taste-modifying the delivery of pharmaceuticals or nutritional supplements have been employed, such as flavored liquid suspensions, coatings on pharmaceutical tablets and/or capsules, and even dissolvable films. However, in each of these situations, the substance to be masked is present at the time of delivery of the taste masking or modifying substance and is primarily one of the ingredients in the composition itself. For example, dissolvable films have been used to deliver pharmaceutical actives to children and to deliver breath-freshening agents such as menthol. In both instances, the substance to be taste-masked was either present in the formulation itself or was already present, which makes developing taste masking formulations easier and/or more predictable.

SUMMARY OF INVENTION

Edible compositions are disclosed herein that mask the unpleasant taste of foods, in particular, those foods that have a bitter taste. In one embodiment, the taste masking effectiveness delivered by the edible composition lasts for up to 5 to 15 minutes. The composition may be in the form of any suitable delivery vehicle. In one embodiment, the delivery vehicle is a film. In another embodiment, the delivery vehicle is a gummi confectionery. In another embodiment, the composition is in the form of sprinkleable granules.

In one aspect edible compositions that mask the taste of foods are disclosed. The edible compositions include a delivery vehicle, a protein masking agent constituting about 0.01% to about 25% dry weight of the edible composition and a bitter masking agent constituting about 0.1% to about 7% dry weight of the edible composition. The delivery vehicle may be or include a film former, a gelling agent, or combinations thereof that have taste masking properties. The composition may also include carbohydrates, a sensate, and/or a sweetening agent.

DETAILED DESCRIPTION OF INVENTION

To address the unpleasant taste of some foods, which stop some people from eating them, edible compositions were developed to mask their taste. The edible compositions disclosed herein are designed to be placed in a user's mouth (or oral cavity) for chewing and/or dissolving, depending upon the delivery vehicle. Once chewed and/or dissolved, the formulation's ingredients such as one or more taste masking agents, a sensate, a flavoring agent, or a sweetening agent act upon the taste receptors in the oral cavity, including those around the tongue, on the soft palate at back roof of the mouth, and even the epiglottis, to provide a physiological effect of lasting taste masking effectiveness.

In one embodiment, the delivery vehicle of the edible taste masking composition is as an edible film. In another embodiment, the delivery vehicle of the edible composition is as an edible gummi confectionery. The delivery vehicle may also be, but is not limited to a chewable tablet, a liquid carrier, a hard confectionery, a gel confectionary, a foam confectionary, a chewing gum, a dissolvable tablet, and a powder or granular confectionary. These are non-limiting examples of delivery vehicles.

Methods for making such delivery vehicles are known and can be adapted for by one of skill in the art to provide a delivery vehicle for the taste masking compositions disclosed herein. Various methods for forming orally disintegrating tablets, whether by applying heat or a non-heat process, orally disintegrating films, chewing gums, particles and/or microencapsulated compositions are described in the article "Orally Disintegrating Systems: Innovations in Formulation and Technology" by Goel et al. in *Recent Patents on Drug Delivery & Formulation*, 2008, Vol. 2, No. 3, pages 258-274. The article and the patents referenced therein teach how to make such delivery vehicles.

The delivery vehicles described in the Goel et al. article are directed to the delivery of an active pharmaceutical ingredient. The edible compositions herein, regardless of the delivery vehicle, are free of an active pharmaceutical ingredient. As used herein, the phrase "active pharmaceutical ingredient" or "API" means any substance or mixture of substances intended to be used in the manufacture of a drug (medicinal) product and that, when used in the production of a drug, becomes an active ingredient of the drug product. Such substances are intended to furnish pharmacological activity or other direct effect in the diagnosis, cure, mitigation, treatment, or prevention of diseases or other ailments. The taste masking agents, sensates, flavoring agents, and sweeteners that individually may contribute to the taste masking effect are not active pharmaceutical ingredients as defined herein.

The edible film may be referred to as an "edible thin film." As used herein, "edible thin films" refers to compositions that include a film-former substrate and are designed to adhere to at least a portion of the oral cavity of a consumer and rapidly dissolve therein. "Rapidly dissolve" means that the substrate dissolves in less than 20 seconds, preferably less than 15 seconds and most preferably less than 10 seconds. To "dissolve" means to substantially lose the shape and form of the substrate. An example of an edible thin film product is the Listerine® PocketPaks™ oral care strip sold by Pfizer.

In addition to the film-former, the edible thin films include a physiological effective amount of a protein masking agent and a physiological effective amount of a bitter masking agent. The term "masking agent" as used herein, with respect to all the compositions disclosed herein, also encompasses substances that may be classified as taste-receptor blockers. The edible thin films may include a sensate, a flavoring agent, and/or a sweetening agent. It is understood that one or more of any of these individual ingredients may be used in a formulation. For example, the composition, in one embodiment, includes one protein masking agent, two bitter masking agents, one sensates, one flavoring agent, and one sweetening agent as shown in Example 3 below.

Any suitable water-soluble, film-former can be used to produce an edible thin film product. Suitable film-formers include but are not limited to water-soluble non-starch polysaccharides such as carboxymethylcellulose (CMC), methylcellulose, hydroxypropylmethylcellulose (HPMC), guar gum, locust bean gum, xanthum gum, carrageenan, algins, propylene glycol, levan, elsinan, pullulan, pectins, chitosan, and gum arabic; native starches such as corn starch, waxy maize starch, high-amylose corn starch, potato, tapioca, rice and wheat starch; modified starches such as those that have been acid modified, bleached, oxidized, esterified, etherified, crosslinked, and treated enzymatically; starch hydrolyzed products such as maltodextrin; protein such as albumen, gelatin, casein, salts of casein, whey, wheat gluten, zein, and protein derived from soybeans; polymers such as polyvinyl pyrrolidone, methycrylate copolymer, and carboxyvinyl copolymers alone or in any combination. Of the suitable film formers, it is desirable to select film-formers that have task masking properties of their own. In one embodiment, the concentration of the film-forming agent constitutes between about 5% to about 60% by dry weight, or 20% to about 40% by dry weight of the final composition.

If it is desired to use lower levels of film forming agents, softeners can also be employed to ensure the flexibility of the film, thereby reducing brittleness. The softeners, which are also known as plasticizers, may include tallow, hydrogenated tallow, hydrogenated and partially hydrogenated vegetable oils, cocoa butter, sorbitol and other polyols, including polyoxyethylene sorbitan monooleate, glycerin, polyethylene glycol, propylene glycol, invert sugars, corn syrup, lecithin, hydrogenated lecithin, mono-, di- and triglycerides, acetylated monoglycerides, fatty acids (e.g. stearic, palmitic, oleic and linoleic acids), Polyoxyethylene (80) sorbitan monooleate, and combinations thereof. In one embodiment, the softener may constitute 0% to about 20% by dry weight of the final composition, or about 2% to about 10% by dry weight of the final composition.

The edible compositions disclosed herein, including the edible thin film described above, include one or more protein masking agents. Protein masking agents are generally oil and water soluble compositions, that coat the taste receptors and makes them non-responsive to the unpleasant taste of proteins and/or flavors selected to deceive the senses into associating the bitterness with an acceptable substance such as chocolate or a fruit flavor. In the compositions disclosed herein, the protein masking agent is present in a physiological effective amount to mask the protein-based components of a selected food. In one embodiment, the protein masking agent constitutes about 0.01% to about 25% dry weight of the final composition. In another embodiment, the protein masking agent constitutes about 3% to about 18% dry weight of the final composition.

One suitable protein masking agent is GSB Natural Masking Agent for Animal Protein O.S. #5187, which is an oil soluble liquid flavoring that masks the unpleasant taste of protein notes in a composition, has a sausage-like odor and flavor, is a light to medium yellow colored free-flowing liquid, has a specific gravity (density) at 25° C. of 0.899 to 0.959 g/ml, and includes refined coconut oil as a non-flavor ingredient.

Other flavors may mask the unpleasant taste of proteins and other bitter-tasting ingredients. For examples, vanilla, chocolate, coffee and caramel flavors may be used to mask protein, in particular the bitterness often associated with protein. Fruit flavors may also be used to mask the taste of proteins. Acids found naturally in fruit such as malic acid (apple's primary acidulant) and citric acid (prevalent in strawberries) deceive the senses into associating the bitterness with the fruit used, rather than the protein.

In another embodiment, a combination of soy protein isolate and pectin can be added to the composition to taste mask a casein hydrolysate. Solae's Supro soy protein isolate (SPI) and CP Kelco's Genu low-methoxy pectin are examples of a suitable combination.

One or more bitter masking agents may be present in the edible compositions, especially in combination with the protein masking agent. The protein masking agents and the bitter masking agents can work individually, but when working together they provide a synergistic effect on the taste masking effectiveness of the composition. In one embodiment, the bitter masking agent(s) constitutes about 0.1% to 25% dry weight of the final composition. In another embodiment, the bitter masking agent(s) constitutes about 5% to 20% dry weight of the final composition. In an embodiment where there are two bitter masking agents present, each bitter masking agent may be present as about 1% to 10% of the dry weight of the final composition.

A particularly effective class of compounds which can function as a bitter masking agent are hydrogenated, ethoxylated glycerol esters. These types of compounds are commercially available and may be formed in a well-known manner, namely by the ethoxylation of glycerol. One commercially available compound which works as a bitter masking agent is sold by the BASF Company under the trade name CREMOPHOR®, including CREMOPHOR® 40 and CREMOPHOR® 60 hydrogenated ethoxylated castor oils. Other suitable bitter masking agent or blocker include, but are not limited to adenosine 5'-monophosphate, thymidine 5' monophosphate, adenosine 5' diphosphate, adenosine 3' monophosphate, adenosine 5'-succinate, adenosine 5' triphosphate, adenosine 2' monophosphate, 5'-cytidylic acid, inosinic acid. Some commercially available bitter masking agents, include Ottens BITTERNESS BLOCKERS® NI-1915-A and Firmenich SWEETNESS ENHANCER® 598960 TP 1054, Quest NATURAL BITTER BLOCKERS®, Fontarome MAG-NIFIQUE®, Givaudan MASKING FLAVOR®, WILD FAE®, GSB Natural Soy Masking Flavor (Milk Type) P.F. #8236, GSB Natural Sweetness Masking Flavor W.S. #7895, GSB Natural Masking Agent Flavor W.S. #5206, GSB Natural Masking Flavor W.S. #6500, GSB Natural Sugar Extender Type Flavor W.S. #8490, Mother Murphy NAT. MASKING TYPE FLAVOR 188505, Mother Murphy NAT. MASKING FLAVOR 155122, Mother Murphy NAT. BITTER MASKING FLAVOR 2111197, Mother Murphy N&A MASKING FLAVOR, W.S. 2110085, Taste Advantage Natural Flavor-Mouthfeel Enhancer Type 1 in EtOH, Biogapress™ Vegetal BM 297 ATO Glyceryl dipalmitostearate, Glycerol monostearate (type I) EP, Mono and diglycerides NF, Precirol®

ATO 5 Glycerol distearate (type I) EP, Glyceryl distearate NF, other commercially available bitter masking agents, and combinations thereof.

Another bitter masker, actually a bitter taste receptor inhibitor, is probenecid (also known as 4-(dipropylsulfamoyl)benzoic acid).

The compositions disclosed herein may also include a variety of sensates. The sensates may be a physiological cooling agent, a physiological warming agent, or a physiological tingling agent, each of which are effective on the mucous membranes of the oral cavity. The formulations disclosed herein may include one or more of each type of sensate and/or combinations thereof. The total sensate content of the final composition may constitute about 0.1% to about 25% dry weight of the final composition, about 1% to about 15% by dry weight of the final composition, or about 1% to 5% by dry weight of the final composition.

As used herein, "physiological cooling agent" does not include traditional flavor-derivatives such as menthol or menthone. Suitable physiological cooling agents are those that do not have a perceptible flavor of their own, but simply provide a cooling effect. The physiological cooling agent may constitute about 0.1% to about 25% dry weight of the film, or about 1% to about 15% by dry weight of the film. The physiological cooling agents include, but are not limited to, isopulegol, N-substituted-p-menthane-3-carboxamides, acyclic tertiary and secondary carboxamides, 3-1-menthoxy propan-1,2-diol, p-menthane-3,8-diol, monomenthyl glutarate, and monomenthyl saccidate, alone or in any combination. The N-substituted-p-menthane-3-carboxamides, such as N-ethyl-p-menthane-3-carboxamide, and trimethyl isopropyl butanamide are both commercially available under the trademark Winsense® from LyondellBasell Flavors & Fragrances, LLC, for example as WS-3 and WS-23, respectively. Monomenthyl glutarate is commercially available under the trademark Ultracool 2 from IFF (Netherlands).

Other physiological cooling agents include, but are not limited to, 3-(1-menthoxy)-2-methylpropane-1,2-diol, p-menthane-2,3-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, menthone glycerol ketal, menthyl lactate, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, and menthyl pyrrolidone carboxylate.

The compositions of the present invention may include a warming agent alone or in addition to other sensates such as cooling agents and/or tingling agents. The warming agent is preferably present in a physiologically effective amount. The warming agent may constitute about 0.001% to about 10%, or from about 0.005% to about 5%, or from about 0.01% to about 1% by dry weight of the final composition.

Suitable physiological warming agents include, but are not limited to, vanillyl alcohol n-butyl ether, vanillyl alcohol n-propyl ether, vanillyl alcohol isopropyl ether, vanillyl alcohol isobutyl ether, vanillyl alcohol n-amino ether, vanillyl alcohol isoamyl ether, vanillyl alcohol n-hexyl ether, vanillyl alcohol methyl ether, vanillyl alcohol ethyl ether, gingerol, shogaol, paradol, zingerone, capsaicin, dihydrocapsaicin, nordihydrocapsaicin, homocapsaicin, homodihydrocapsaicin, ethanol, iso-propyl alcohol, iso-amylalcohol, benzyl alcohol, chloroform, eugenol, cinnamon oil, cinnamic aldehyde, phosphate derivatives thereof, and mixtures thereof. The phosphate derivatives mentioned are those described in WO 97/02273. A commercial example of a suitable warming agent for use herein is Optaheat (Symrise, Germany).

The compositions herein may also include a physiological tingling agent alone or in addition to the cooling agent and/or the warming agent. As used herein, "physiological tingling agent" refers to agents which trigger a tingling, stinging, or numbing sensation in the oral cavity. These tingling agents may be selected from a plethora of compounds (plant extracts or synthetic compounds) that are known in the art to provide a tingling sensation and are used accordingly in a number of food products. Such plant extracts include extracts from pepper, onion, garlic, radish, horseradish, mustard, chili, ginger etc. These may also include, but are not limited to Jambu Oleoresin or para cress (*Spilanthes* sp.) in which the active ingredient is Spilanthol; Japanese pepper extract (*Zanthoxylum peperitum*), including the ingredients known as Saanshool-I, Saanshool-II and Sanshoamide; black pepper extract (*piper nigrum*), including the active ingredients chavicine and piperine; Echinacea extract; Northern Prickly Ash extract; and red pepper oleoresin.

The edible composition may also include a carbohydrate. The carbohydrate adds nutritional benefits to the composition and may be desirable for children. The carbohydrate may constitute about 1% to about 25% dry weight of the final composition, or about 5% to about 20% dry weight of the final composition, or about 8% to about 18% dry weight of the final composition. Suitable carbohydrates include, but are not limited to, wheat flour, flour, dextrin, maltodextrin, carboxymethylcellulose (CMC), methylcellulose, hydroxypropylmethylcellulose (HPMC), guar gum, locust bean gum, xanthum gum, carrageenan, algins, levan, elsinan, pullulan, pectins, chitosan, and gum arabic; native starches such as corn starch, waxy maize starch, high-amylose corn starch, potato, tapioca, rice and wheat starch, modified starches such as those that have been acid modified, bleached, oxidized, esterified, etherified, and combinations thereof.

A variety of flavoring agents can also be added to the edible thin films. Any suitable amount and type of artificial and/or natural flavoring agents can be used in any sensorially acceptable fashion. For example, the flavor can constitute about 0.1% to about 30%, or about 1 to about 20%, or about 5% to about 15% dry weight of the final composition. The flavoring agent can include, for example, essential oils, synthetic flavors or mixtures including but not limited to oils derived from plants and fruits such as citrus oil, fruit essences, peppermint oil, spearmint oil, other mint oils, clove oils, oil of wintergreen, anise and the like, or combinations thereof. Other suitable flavoring agents include chocolate flavors, cocoa powder, vanilla, vanillin and ethyl vanillin.

The flavor can be enhanced and distributed evenly throughout the product by emulsification. Any suitable amount and type of natural and/or synthetic food-grade emulsifier can be used. For example, the emulsifier can include lecithin, food-grade non-ionic emulsifiers, such as a starch or modified starch, fatty acids ($C_{10}$-$C_{18}$), mono and diacyl glycerides, ox bile extract, polyglycerol esters, polyethylene sorbitan esters, propylene glycol, sorbitan monopalmitate, sorbitan tristearate, other like emulsifiers or combinations thereof.

The flavors are emulsified using any suitable emulsification process, such as mechanical processing, vigorous stirring, intense pressure fluctuations that occur in turbulent flow such as homogenization, sonification, colloid milling and the like.

Sweetening agents may also be used in the edible compositions. The sweetening agents may include sugar sweeteners and/or sugarless sweeteners, including high intensity artificial sweeteners. The sugar sweeteners generally include saccharide-containing components including, but not limited to, sucrose, dextrose, maltose, dextrin, invert sugar, fructose, levulose, galactose, corn syrup solids, vanilla syrup, and the like, alone or in any combination. Sugarless sweeteners include, but are not limited to sugar alcohols, such as sorbitol, mannitol, xylitol, isomalt, hydrogenated starch hydrolysates, maltitol, and the like, alone or in any combination. The high intensity artificial sweeteners include, but are not limited to, sucralose, aspartame, N-substituted APM derivatives such as neotame, salts of acesulfame, alitame, saccharin and its salts, cyclamic acid and its salts, glycyrrhizin, dihydrochalones, thaumatin, monellin, and the like, alone or in any combination. Combinations of sugar and/or sugarless sweeteners may be used in the film product in any suitable amount. In one embodiment, the sweetening agent constitutes about 1% to about 20%, or about 2% to about 15% dry weight of the final composition.

If desired, the edible compositions may also include colorants or coloring agents which can be used in any suitable amount to produce a desired color. Further, the edible compositions of the present invention may have multi-colored patterns and/or other related designs or shapes to produce color contrasts. Coloring agents can include, for example, natural food colors and dyes suitable for food, drug, and cosmetic applications. The colorants are typically known as FD&C dyes and lakes such as FD&C Blue No. 1, FD&C Blue No. 2, FD&C Green No. 3, FD&C Yellow No. 5, FD&C Yellow No. 6, FD&C Red No. 3, FD&C Red No. 33, FD&C Red No. 40, and combinations thereof. The coloring agents may constitute about 0.01% to about 1% dry weight of the final composition.

In one embodiment, the edible composition may include a colorant or coloring agent that changes color. The color change may be chemically activated and/or temperature activated.

Depending on the ingredients being used to make the edible compositions, preservatives may also be employed to ensure the safety and quality of the final composition. Suitable preservatives include, but are not limited to, sorbic acid, sodium benzoate, potassium sorbate, methyl p-hydroxybenzoate, sodium propionate, and propyl p-hydroxybenzoate alone or in any combination. In addition, suitable antioxidants can also be utilized. Preservatives or the antioxidants may be present in the composition as 0.01% to about 1% dry weight of the final composition.

As should be noted by the discussion above and the examples herein, typically no encapsulation is involved in the edible formulations.

In another embodiment, the edible compositions may include nutritional or supplemental additives such as vitamins, antioxidants, minerals, trace elements, fibers, and mixtures thereof. As seen in Example 2 below, the composition may include more than one vitamin and more than one mineral or trace element. The vitamins may include vitamin A, B1 (thiamin), B2 (riboflavin), B6, B12, C, D, E and/or derivative thereof, niacin, folic acid, biotin, and pantothenic acid in a nutritionally acceptable form and amount. Examples of mineral and trace elements suitable for the edible compositions include calcium, iron, phosphorous, iodine, magnesium, manganese, zinc, copper, sodium, choline, potassium, selenium, and chromium in a nutritionally acceptable form and amount. Suitable antioxidants include alpha-tocopherol, citric acid, butylated hydroxytoluene, butylated hydroxyanisole, ascorbic acid, fumaric acid, malic acid, sodium ascorbate, and ascorbic acid palmitate in a nutritionally acceptable form and amount.

When the delivery vehicle is an edible thin film, a variety of different processes can be used to form the film. One such process is as follows: (1) an aqueous solution is formed by blending film-forming materials together with water, which are agitated until the powdered materials are mostly hydrated and a few lumps are present; (2) to this mixture, protein masking agents, bitter masking agents, and other ingredients such as plasticizers, softening agents, colors, sweeteners, cooling agents, and/or flavoring agents are blended together to form a homogeneous solution; and (3) this solution is then cast onto a suitable carrier, and dried to form a film.

The carrier material should be impermeable to the film coating, allowing the film coating to disperse evenly onto the carrier. This also allows for ease of removal of the plastic film from the carriers. Examples of suitable carriers include plastic or polyester films, polypropylene, polycarbonate, non-siliconized polyethylene terephthalate film, non-siliconized Kraft paper, polyethylene impregnated Kraft paper, metal belts, voltage or corona treated belts, drum dryers, and polytetrafluorethylene-impregnated glass fabric. Multiple carriers may be employed to create a multi-layered film product. The carriers may be coated with a release coating.

It has been found that a particularly preferred method of casting the film on the carrier may be through use of a slot die extrusion. By use of multiple extruders and appropriately constructed dies, it is possible to add multiple color stripes or designs to the product. It is also possible to oscillate the die head to produce wavy lines on the product. The resulting films can be laminated to produce various visual effects.

The casting of the solution onto a suitable carrier material can be performed using any conventional coating technique. Examples of coating techniques include spraying, dipping, comma coaters, knife over plate, roll over roll, reverse roll, slot die extrusion, and various extrusion techniques. Film thickness can be controlled by adjusting the gap on the coating head, or by applying the desired amount of the solution onto the substrate/carrier.

No particular limitation is placed on the thickness of the film layer except that the resultant film must rapidly dissolve in the mouth of the consumer. Therefore the thickness of the film can be varied based on, for example, the desired speed of dissolution of the edible film while in the oral cavity. Not only can the thickness be varied but a multi-layered film product may be provided. Typically the edible thin films are a single layer film.

After the coating step, the film may pass through a dryer for moisture reduction. In the dryer, drying is carried out through a variety of different means, such as high velocity turbulent hot air, conduction from steam heated slide bed, direct heating or casting of film onto a heated drum or belt, hot or cold air impingement, infrared heating, or any other suitable drying equipment that does not adversely affect the components of the film.

The edible thin films may then be processed to a desirable size to deliver a taste masking effective amount of the taste masking composition. In one embodiment, the edible thin films may be formed or cut as strips that are dimensioned to a desired size. For instance, the films may be 0.75 inch by 1.25 inch. While these dimensions illustrate that the film is cut as a rectangle, it is not limited thereto and any shape including, but not limited to, square, diamond, circular, elliptical, and a die cut of any predetermined shape. Procedures for forming or cutting the edible thin films are well known in the art.

Another delivery vehicle for the edible composition is as a gummi confectionary. Similarly to the edible thin films these confectionary compositions are designed to dissolve in the oral cavity in about 20 seconds or less (typically upon chewing) to provide the taste masking effect. The edible gummi confectioneries include a gelling agent to provide the confectionery composition with moldable and/or settable characteristics such that the confectionery can conform to the shape of a mold and thereafter retain that shape. In addition to the gelling agent, the confectionery composition includes a physiological effective amount of a protein masking agent and a physiological effective amount of a bitter masking agent as discussed above. The confectionery composition may also include a sensate, a flavoring agent, and/or a sweetening agent, again as discussed above. It is understood that one or more of any of these individual ingredients may be used in a confectionery composition.

Any suitable gelling agent can be used to produce a gummi confectionery product. Suitable film-formers include but are not limited to gelatin, gum arabic, pullulan, pectin, agar, carrageenan, clear gum, xanthan gum, alginic acid, alginates such as sodium alginate, potassium alginate, ammonium alginate, calcium alginate, locust bean gum, tapioca starch, konjac, *ficus pumila*, gellan gum, dextrin, maltodextrin, modified food starches, corn starch. In one embodiment, the concentration of the gelling agent constitutes between about 0.5% to about 30% dry weight, or about 1% to about 15% dry weight of the gummi confectionery.

The gelling agent is typically present in an aqueous solution. Accordingly, the gummi confectionery contains water as the balance of the composition. In one embodiment, the water may constitute about 40% to about 90%, or about 50% to 80% by weight of the gummi confectionery.

The edible gummi confectionery includes at least one protein masking agent. The protein masking agent may be any of the substances discussed above for the edible thin films. The protein masking agent may constitute about 0.01% to about 20%, or about 1% to about 15%, or about 5% to about 10% dry weight of the gummi confectionery.

The edible gummi confectionery includes at least one bitter masking agent. The bitter masking agent may be any of the substances discussed above for the edible thin films. In one embodiment, the bitter masking agent constitutes about 0.1% to about 10%, or about 0.5% to about 7.5% dry weight of the gummi confectionery.

The edible gummi confectionery may also include one or more sensates. The sensate may be a physiological cooling agent, a physiological warming agent, or a physiological tingling agent as discussed above for the edible thin films. The sensate(s) may constitute content about 0.1 to about 25%, or about 1% to about 15% dry weight of the gummi confectionery.

The edible gummi confectionery may also include one or more flavoring agents. The flavoring agents may be any of the substances discussed above for the edible thin films. Any suitable amount can be used in any sensorially acceptable fashion. In one embodiment, the flavoring agent can constitute about 0.1% to about 30%, or about 1% to about 20%, or about 5 to about 15% dry weight of the gummi confectionery.

Sweetening agents may also be used in the edible gummi confectionery. The sweetening agents may include any of the sweeteners and combinations thereof, discussed above for the edible thin films. In one embodiment, the sweetening agent constitutes about 1% to about 15%, or about 2% to about 10% dry weight of the gummi confectionery.

Additionally, the gummi confectionery may include other ingredients to provide desired characteristics to the composition. For example, coloring agents, preservatives, other thickening agents, emulsifiers, plasticizers, antioxidants, and combinations thereof may be added to the composition.

Edible gummi confectionery may be manufactured by preparing molds, preparing a gummi confectionery composition, pouring the gummi confectionery composition in the mold, allowing the composition to set, and removing the set gummi confectionery from the mold. The gummi confectionery composition may be prepared by dissolving a gelling agent in water and heating to dissolve the gelling agent. To the gelling agent solution the taste masking agents, sensates, sweeteners, flavoring agents and any other ingredients may be added with mixing. The resulting gummi confectionery composition may be molded into desired shapes that will deliver the correct amount of the taste masking composition.

In another embodiment, the gummi confectionary may include a hydrocolloid ingredient in addition to the gelling agent. Suitable hydrocolloids include natural and modified gums, cellulosics, modified cellulosics, pectins, mucillages, modified starches, noncellulosic polysaccharides, algal polysaccharides and mixtures thereof. More specifically the hydrocolloids include starch, agar-agar, microcrystalline cellulose, methylcellulose, hydroxypropyl cellulose (HPC), hydroxypropyl methylcellulose (HPMC), xanthan gum, carrageenan gum, locust bean gum, alginates, acacia, carboxymethylcellulose (CMC), karaya gum, acacia gum, sodium alginate, sodium CMC, guar gum, tragacanth, mixtures of the hydrocolloids and the like.

When including a hydrocolloid, various ratios of gelatin/hydrocolloids have been developed which have been found to possess beneficial mouthfeel, texture and chewing characteristics. For example, when using starch, the weight ratio of from about 1:1.3 to about 1:1.8 possesses desirable characteristics. More preferably the gelatin/starch weight ratio is from 1:1.4 to about 1:1.55 and most preferably the weight ratio is about 1:1.50. When agar-agar is used, the weight ratio is about 1:0.35 to about 1:1.5, preferably from 1:0.6 to about 1:1.2, and most preferably about 1:0.75. When employing hydroxypropylcellulose, the ratio is from about 1:0.2 to about 1:0.8, preferably the HPC/starch weight ratio is from about 1:0.3 to about 1:0.6 and most preferably the weight ratio is about 1:0.45. Those with skill in the art will recognize that other hydrocolloids can be used in combination with the specified hydrocolloids in the ratios specified, i.e., a mixture of two or more hydrocolloids, without departing from the present invention.

The edible taste masking compositions disclosed herein are useful for masking the taste of foods such as those having a bitter taste or an unpleasant taste due to the presence of proteins. Other applications for the taste masking compositions disclosed herein may include the use of the composition to mask other substances that include a bitter component and/or a protein component.

In another embodiment, the edible composition, as part of the delivery vehicle, includes a film former, a gelling agent, or combinations thereof that have taste masking properties. Suitable film formers or gelling agent that have taste masking properties include but are not limited to pullulan, pea starch, hydroxypropyl methylcellulose, carboxymethylcellulose (CMC), methylcellulose, hydroxypropylmethylcellulose (HPMC), guar gum, locust bean gum, xanthum gum, carrageenan, algins, propylene glycol, levan, elsinan, pectins, chitosan, and gum arabic, native starches such as corn starch, waxy maize starch, high-amylose corn starch, potato, tapioca, rice and wheat starch, modified starches such as those that have been acid modified, bleached, oxidized, esterified, etherified, crosslinked, and treated enzymatically, starch hydrolyzed products such as maltodextrin, protein such as albumen, gelatin, casein, salts of casein, whey, wheat gluten, zein, and protein derived from soybeans, polymers such as polyvinyl pyrrolidone, methycrylate copolymer, and carboxyvinyl copolymers.

To use the edible compositions in the various delivery forms, the user may eat the edible composition before eating food or may apply the edible composition to the food and then eat it. If the edible composition is an edible thin film, the thin film may be placed on the tongue and allowed to dissolve before food is consumed. If the edible composition is a meltable film, the film may be placed on hot food or heated, and then consumed. The meltable film may melt at a temperature of about 110° F. through about 200° F. In one embodiment, the meltable film includes a cheese flavor such that after melting a cheese sauce results. If the edible composition is a sprinkleable composition, the composition may be sprinkled onto any desired bitter tasting and/or protein containing food as needed to mask the taste. The sprinkleable composition may be packaged in a shaker, a small pouch, in a straw-shaped stick, or the like. In another embodiment, the delivery vehicle may be a dry powder that is dissolvable or mixable with water to form a pourable mixture. The pourable mixture may be generally thick (higher in viscosity than water) such that the mixture is thick like syrup.

A sprinkleable composition typically includes a powder or granule that includes the edible composition. The edible composition may be internal to the powder or granule or may be coated on its exterior. In one embodiment, the powder or granule may be porous and the edible composition may be absorbed therein. Suitable powders or granules may include sugar, an artificial sweetener, salt, inert crystal polyols, micro crystalline cellulose, dietary fibers, sodium alginate, xylitol, mannitol, and combinations thereof. Examples of inert crystal polyols are described in United States Published Patent Application 2011/0123692. The edible composition as a coating on the powder or granule may be applied using known coating techniques including immersion, spray coating, etc.

The present invention is further illustrated by the following non-limiting examples.

Example 1

Edible Film for Taste Masking of Foods

Part A: An aqueous solution of 40% gum arabic and wheat starch was prepared using standard techniques to dissolve the gum arabic and the wheat starch in the water while heating and stirring.

Part B: An emulsion of a selected flavor, here bubble gum, was prepared by placing 100 ml of the 40% gum arabic/wheat starch solution into a blending vessel, weighting out selected flavors and an emulsifying agent, and slowly adding the flavors and emulsifying agent to the blending vessel with mixing. Once added, the mixing was maintained for about 30 additional minutes to form the emulsion. The dry weight percent for the ingredients added to the 40% gum arabic are presented below in Table 1.

TABLE 1

| Ingredient | Dry Wt % |
|---|---|
| emulsifying agent | 60 |
| bubble gum flavoring | 40 |

Part C: The emulsion of the selected flavor was added to a film formulation. The film formulation was prepared as a slurry by mixing the following ingredients together using known techniques and then casting the film formulation onto a paper coated with or having a release surface so that the film will be removable therefrom. The slurry includes 100 grams of water and the amount of the remaining ingredients as indicated below in Table 2 in dry weight percent based on the final film produced.

TABLE 2

| Ingredient | Dry Wt % |
|---|---|
| whole wheat flour | 8.4 |
| pea starch | 15 |
| pullulan | 20 |
| HPMC | 4 |
| polysorbate 80 | 1.5 |
| glycerin | 3 |
| the emulsion of flavors from Part B | 35 |
| protein masker | 5 |
| bitter masker* | 5 |
| FD&C red | 0.1 |
| sweetener | 3 |
| Total: | 100 |

The bitter masker included a first bitter masker and a second bitter masker at 1.8 dry weight percent and 2.8 dry weight percent, respectively.

Part D: The slurry from part C is cast onto the release paper by a slot die coater laying down a coating of 20 mil at a line speed of 1-3 fpm while the slurry is warm (about 104° F. (40° C.)). The release paper coated with the slurry passed through an oven at a temperature of about 180 to 200° F. (356-392° C.) to evaporate the water and form a film.

The resulting film may be cut to any desired dimensions for packaging and/or consumption.

Example 2

Edible Film of Example 1 Including Vitamins

Part B of Example 1 is modified such that selected vitamins are added to the emulsion. The vitamins were added with the flavoring to the emulsifying agent. The emulsion was prepared by placing 100 ml of the 40% gum Arabic/wheat starch solution into a blending vessel, weighting out selected flavor, vitamins and an emulsifying agent, and slowly adding the flavor, vitamins and emulsifying agent to the blending vessel with mixing. Once added, the mixing was maintained for about 30 additional minutes to form the emulsion. The dry weight percent for the ingredients added to the 40% gum Arabic/wheat starch were:

TABLE 3

| Ingredient | Dry Wt % |
|---|---|
| emulsifying agent | 60 |
| Bubble Gum flavoring and Vitamins | 40 |

TABLE 4

The vitamins added to the emulsion were a vitamin blend of the following composition:

| Ingredient: | Amount: |
|---|---|
| Vitamin A | 3000 IU |
| Vitamin C | 60 mg |
| Vitamin D | 400 IU |
| Vitamin E | 30 IU |
| Thiamin (B1) | 1.5 mg |
| Riboflavin (B2) | 1.7 mg |
| Niacin | 15 mg |
| Vitamin B6 | 2 mg |
| Folic Acid | 400 mcg |
| Vitamin B12 | 6 mcg |
| Biotin | 40 mcg |
| Pantothenic Acid | 10 mg |
| Calcium (elemental) | 100 mg |
| Iron | 18 mg |
| Phosphrous | 100 mg |
| Iodine | 150 mcg |
| Magnesium | 20 mg |
| Zinc | 12 mg |
| Copper | 2 mg |
| Sodium | 10 mg |
| Choline | 38 mg |

Part C of Example 1 was repeated but the emulsion now containing the vitamin blend was used in place of the flavor emulsion of Example 1. The flavor and vitamin emulsion still constituted 35% of the dry weight of the film formulation found above in Table 2.

Part D of Example 1 was also repeated and resulted in an edible film that may be cut to any dimensions for packaging and/or consumption.

Example 3

Grape Flavored Edible Film for Taste Masking of Vegetable Products

Part A: An aqueous solution of 40% gum arabic was prepared using standard techniques to dissolve the gum arabic in the water while heating and stirring Part B: An emulsion of a selected flavor, here grape, was prepared by placing 80 ml of the 40% gum arabic solution into a blending vessel, weighting out selected flavor and an emulsifying agent, and slowly adding the flavors and emulsifying agent to the blending vessel with mixing. Once added, the mixing was maintained for about 20 additional minutes to form the emulsion. The dry weight percent for the ingredients added to the 40% gum arabic were:

TABLE 5

| Ingredient | Dry Wt % |
|---|---|
| emulsifying agent | 43 |
| Grape flavoring | 43 |

Part C: The emulsion of the selected flavor was added to a film formulation. The film formulation was prepared as a slurry by mixing the following ingredients together using known techniques and then casting the film formulation onto a paper coated with or having a release surface so that the film will be removable therefrom. The slurry includes 90 grams of water and the amount of the remaining ingredients as indicated below in dry weight percent based on the final film produced.

TABLE 6

| Chemical Name | Dry Wt % |
|---|---|
| De-ionized water | |
| Starch, corn | 18.27 |
| Modified tapioca Starch | 6.71 |
| Polysaccharide | 11.26 |
| Polysorbate 80 | 2.68 |
| poly alcohol | 5.4 |
| Grape flavor emulsion | 18.4 |
| Cooling agent | 1.0 |
| Protein Masker | 16.1 |
| Bitter Masker 1 | 8.05 |
| Bitter Masker 2 | 8.05 |
| Sweetener | 4 |
| FD&C Blue 1 | 0.01 |
| FD&C Red 40 | 0.07 |
| Total % | 100 |

Part D: The slurry from part C is cast onto the release paper by a knife over roll coater set at a coating gap of 13 mil, at a line speed of 2 to 4 fpm, while the slurry is at room temperature. The release paper coated with the slurry passed through an oven at a temperature of about 180 to 200° F. (356-392° C.) to evaporate the water and form a film.

The resulting film may be cut to any desired dimensions for packaging and/or consumption. The film is placed on hot vegetables and melts, resulting in the vegetables tasting like grape.

Example 4

Cheese Flavored Edible Film for Meat Products Delivering Vitamins

Part A: An aqueous solution of 40% gum Arabic was prepared using standard techniques to dissolve the gum Arabic in the water while heating and stirring Part B: An emulsion of a selected flavor and vitamins, here in Cheese, was prepared by placing 100 ml of the 40% gum Arabic solution into a blending vessel, weighting out selected flavor, vitamins and an emulsifying agent, and slowly adding the flavor, vitamins and emulsifying agent to the blending vessel with mixing. Once added, the mixing was maintained for about 30 additional minutes to form the emulsion. The dry weight percent for the ingredients added to the 40% gum Arabic were:

TABLE 7

| Ingredient | Dry Wt % |
|---|---|
| emulsifying agent | 55 |
| Cheese flavoring and Vitamins | 45 |

TABLE 8

The vitamins added to the emulsion were a vitamin blend of the following composition:

| Ingredient | Amount |
|---|---|
| Vitamin A (33% as beta-carotene) | 3000 IU |
| Vitamin C | 60 mg |
| Vitamin D | 400 IU |
| Vitamin E | 30 IU |
| Thiamin (B1) | 1.5 mg |
| Riboflavin (B2) | 1.7 mg |
| Niacin | 15 mg |

TABLE 8-continued

The vitamins added to the emulsion were a vitamin blend of the following composition:

| Ingredient | Amount |
| --- | --- |
| Vitamin B6 | 2 mg |
| Folic Acid | 400 mcg |
| Vitamin B12 | 6 mcg |
| Biotin | 40 mcg |
| Pantothenic Acid | 10 mg |
| Calcium (elemental) | 100 mg |
| Iron | 18 mg |
| Phosphrous | 100 mg |
| Iodine | 150 mcg |
| Magnesium | 20 mg |
| Zinc | 12 mg |
| Copper | 2 mg |
| Sodium | 10 mg |
| Choline | 38 mg |

Part C: The emulsion of the selected flavor and vitamins was added to a film formulation. The film formulation was prepared as a slurry by mixing the following ingredients together using known techniques and then casting the film formulation onto a paper coated with or having a release surface so that the film will be removable therefrom. The slurry includes water, film forming polymers, taste masking agents, emulsifiers and the flavor and vitamin emulsion. The slurry includes 100 grams of water and the amount of the remaining ingredients as indicated below in dry weight percent based on the final film produced.

TABLE 9

| Chemical Name | Dry Wt % |
| --- | --- |
| De-ionized water | |
| Starch, corn | 12.5 |
| Modified Tapioca Starch | 8.69 |
| Hydroxypropyl methylcellulose | 14.3 |
| Polysorbate 80 | 2 |
| Poly alcohol | 3 |
| Cheese flavor and vitamin blend emulsion | 22.5 |
| protein masker | 15 |
| bitter Masker 1 | 9 |
| Bitter Masker 2 | 9 |
| Sweetener | 4 |
| FD&C Yellow 6 | 0.01 |
| Total % | 100 |

Part D: The slurry from part C is cast onto the release paper by a slot die coater laying down a coating of 20 mil at a line speed of 1-3 fpm while the slurry is warm (about 104° F. (40° C.)). The release paper coated with the slurry passed through an oven at a temperature of about 180 to 200° F. (356-392° C.) to evaporate the water and form a film.

The resulting film may be cut to any desired dimensions for packaging and/or consumption. The film is placed on hot meat product and melts, resulting in cheese sauce on meat product delivering vitamins.

The edible film of Example 4 may also be formulated without the vitamin blend.

Example 5

Edible Gummi Confectionery

Part A: Confectionery molds were prepared by spraying the selected molds with a non-stick cooking spray. The molds are of a size that provides the correct amount of the formulation for the desired extended taste masking effect.

Part B: A grape flavor emulsion was prepared as disclosed in Example 3, Part B.

Part C: A gummi confectionery mixture was prepared by boiling 45 grams of water in a saucepan over medium-high heat and immediately upon boiling adding 30 grams of gelatin with mixing until all dissolved. Once the gelatin was dissolved, 0.5 grams of polysorbate 80, 3.3 grams of the grape flavor emulsion, 1.5 grams of coolants, 0.05 grams of a protein masker, 0.5 grams of a bitter masker, and 2 grams of vanilla syrup were added to the dissolved gelatin with stirring until a homogenous mixture was formed.

Part D: The mixture from Part C was poured into the molds prepared in Part A. The molds were refrigerated until the gummi confectioneries were set. Once removed from the molds, the confectioneries were ready for consumption.

Having described the invention in detail and with reference to specific advantages thereof it will be apparent that numerous modifications are possible without departing from the spirit and scope of the following claims.

What is claimed is:

1. An edible composition that masks the taste of foods comprising:
   a first taste masking agent constituting about 3% to about 25% dry weight of the edible composition, the first taste masking agent being an oil soluble liquid flavoring that masks a taste of animal protein and has a specific gravity at 25° C. of 0.899 g/ml to 0.959 g/ml and is a yellow colored liquid; and
   a second taste masking agent constituting about 5% to about 20% dry weight of the edible composition, the second taste masking agent comprising:
      a hydrogenated, ethoxylated glycerol ester; and
      a masking agent selected from the group consisting of adenosine 5'-monophosphate, thymidine 5' monophosphate, adenosine 5' diphosphate, adenosine 3' monophosphate, adenosine 5'-succinate, adenosine 5' triphosphate, adenosine 2' monophosphate, 5'-cytidylic acid, inosinic acid, and combinations thereof; and/or
      a masking agent selected from the group consisting of Glyceryl dipalmitostearate, Glycerol monostearate (type I) EP, Mono and diglycerides NF, Glycerol distearate (type I) EP, Glyceryl distearate NF, and combinations thereof; and/or
      4-(dipropylsulfamoyl)benzoic acid.

2. The edible composition of claim 1 wherein the edible composition does not contain a pharmaceutical active.

3. The edible composition of claim 1 further comprising a carbohydrate.

4. The edible composition of claim 1 further comprising a film former, a gelling agent, or combinations thereof.

5. The edible composition of claim 1 further comprising a sensate and a sweetening agent.

6. The edible composition of claim 1 wherein the composition includes a flavoring agent, the flavoring agent constituting about 0.1% to about 50% dry weight of the edible composition.

7. The edible composition of claim 6 further comprising a sensate, the sensate constituting about 0.1 to about 25% dry weight of the edible composition.

8. The edible composition of claim 7 wherein the sensate is selected from the group consisting of a physiological cooling agent, a physiological warming agent, and a physiological tingling agent each of which are effective on the mucous membranes of the mouth.

9. The edible composition of claim 1 wherein the composition further comprises a sweetening agent, the sweetening agent constituting about 1 to about 20% dry weight of the edible composition.

10. The edible composition of claim 1 wherein the edible composition is an edible film, and the composition further comprises a film former.

11. The edible composition of claim 10 wherein the film former is selected from the group consisting of carboxymethylcellulose, methylcellulose, hydroxypropylmethylcellulose, guar gum, locust bean gum, xanthum gum, carrageenan, algins, propylene glycol, levan, elsinan, pullulan, pectin, chitosan, and gum arabic, waxy maize starch, high-amylose corn starch, potato starch, tapioca starch, rice starch, wheat starch, a modified starch, dextrin, maltodextrin, albumen, gelatin, casein, salts of casein, whey, wheat gluten, zein, and soybean-derived protein, polyvinyl pyrrolidone, methacrylate copolymers, carboxyvinyl copolymers, and combinations thereof.

12. The edible composition of claim 1 wherein the edible composition is a gummy confectionary and the composition further comprises a gelling agent.

13. The edible composition of claim 12 wherein the gelling agent is selected from the group consisting of gelatin, gum arabic, pullulan, pectin, mucillages, modified starches, corn starch, noncellulosic polysaccharides, algal polysaccharides, agar-agar, methylcellulose, hydroxypropyl cellulose, ethyl cellulose, hydroxypropyl methylcellulose, xanthan gum, carrageenan gum, locust bean gum, alginates, carboxymethylcellulose, karaya gum, acacia gum, sodium CMC, guar gum, tragacanth, kappa carrageenan, gellan gum, clear gum, alginic acid, tapioca starch, konjac, *ficus pumila*, dextrin, maltodextrin, and combinations thereof.

14. The edible composition of claim 1 wherein the edible composition is a sprinkleable granule, and the composition further comprises a granular base that is coated with the first taste masking agent and the second taste masking agent.

15. The edible composition of claim 14 wherein the granular base is selected from the group consisting of sugar, an artificial sweetener, salt, inert crystal polyols, micro crystalline cellulose, dietary fibers, sodium alginate, xylitol, mannitol, and combinations thereof.

16. The edible composition of claim 1 wherein the delivery vehicle is a dry powder that is dissolvable or mixable with water to form a pourable mixture.

17. The edible composition of claim 1 wherein the edible composition is a film that melts at a temperature of about 110° F. to about 200° F.

18. The edible composition of claim 1 wherein the composition upon activation in saliva in a user's oral cavity provides a lasting taste masking effect that endures for up to about 10 to about 15 minutes.

* * * * *